Nov. 13, 1945.   G. C. PEARCE   2,388,800
MOTOR PROTECTOR
Filed Aug. 27, 1942
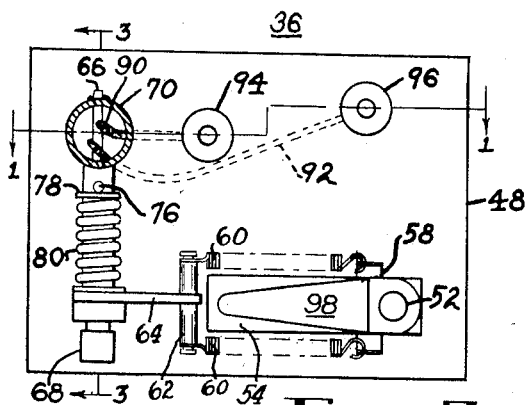
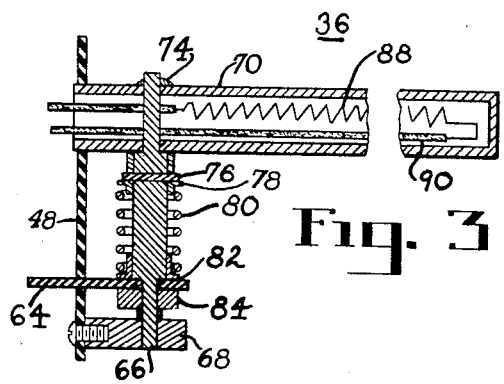
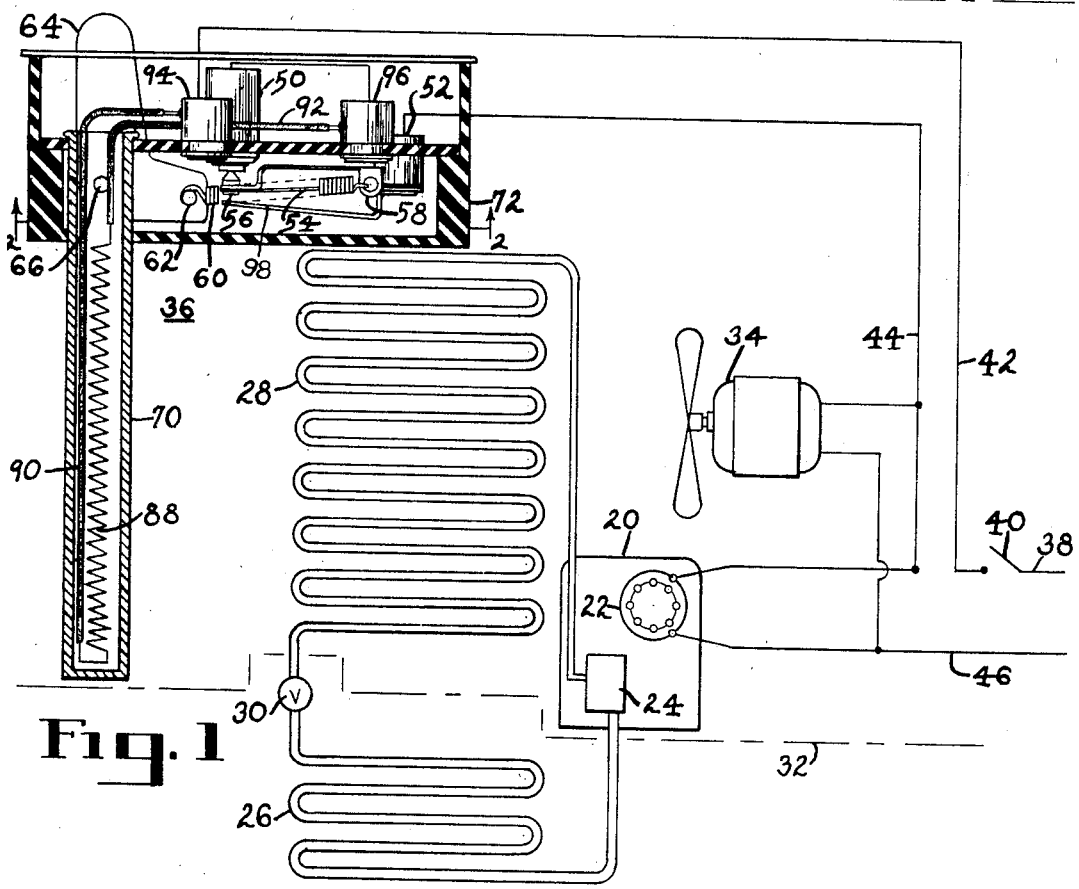
INVENTOR.
George C. Pearce
BY Spencer Hardman and Fehr
Attorneys Patented Nov. 13, 1945

2,388,800

UNITED STATES PATENT OFFICE 2,388,800

MOTOR PROTECTOR

George C. Pearce, Dayton, Ohio, assignor to General Motors Corporation, Dayton, Ohio, a corporation of Delaware Application August 27, 1942, Serial No. 456,325

3 Claims. (Cl. 62—4)

This invention relates to a motor protector and more particularly to a motor protector which will deenergize the motor when the circulation of cooling fluid fails.

In many applications the safe operation of an electric motor is dependent directly or indirectly upon the circulation of a cooling fluid. Heretofore such motors have generally been protected only by the current overload protector. However, in such applications if there is a failure of circulation of cooling fluid, often the motor will overheat before the protector trips, thereby subjecting the motor to damage.

One specific example is a refrigerant condenser unit wherein an auxiliary fan is used to cool the condenser. If the auxiliary fan fails to operate, the condensing pressure rises and the compressor and its driving motor become overloaded. Under such circumstances the motor is liable to be damaged by overheating before the protector trips.

It is an object of my invention to provide a protector system which will stop the main electric motor when the circulation of cooling fluid fails.

It is another object of my invention to provide a protector to be placed in an air stream so as to be responsive to its cooling influence.

It is still another object of my invention to provide a protector located in flowing air which will be adequately protected against foreign matter in the air stream and particularly to be so constructed that foreign matter will not accumulate upon the operating parts thereof.

These objects are attained by providing a protector which is located in the air stream of an auxiliary fan and connected in series circuit relationship with the main driving motor of a condenser unit or other application. The protector includes an enclosed switch mechanism provided with a closed tube extending into the air stream of the fan and provided with a continuously energized electric heater. A suitable thermal device, such as a fusible solder holds the protector in closed position as long as the tube containing the heater is cooled by the fan air stream. Should the fan fail to operate or should the air stream be blocked or diverted, the closed tube containing the heater will rise in temperature and release the fusible solder to cause the protector mechanism to move to open circuit position, thus deenergizing the main driving motor as well as the auxiliary fan motor.

Further objects and advantages of the present invention will be apparent from the following description, reference being had to the accompanying drawing, wherein a preferred form of the present invention is clearly shown.

In the drawing:

Fig. 1 is a sectional view taken along the line 1—1 of Fig. 2, together with a diagrammatic representation of a refrigerating system;

Fig. 2 is a sectional view of the protector shown in Fig. 1 with the container removed taken on the line 2—2 of Fig. 1; and Fig. 3 is a sectional view taken along the line 3—3 of Fig. 2.

Referring now to the drawing and more particularly to Fig. 1, there is shown a refrigerating system including a sealed unit 20 containing an electric motor 22 and a compressor 24 directly driven by the electric motor 22. The compressor 24 withdraws evaporated refrigerant from the evaporator 26 and compresses and forwards the compressed refrigerant to a condenser 28 where the compressed refrigerant is liquefied and returned to the evaporator under the control of a suitable expansion valve 30. The condenser 28 and the sealed unit 20 are located in a duct 32 or other suitable means by which the air-flow from the auxiliary fan 34 is directed over the heat exchange surfaces of the condenser 28 and the sealed unit 20.

Heretofore it has been customary to protect the driving motor 22 by a thermal overload protector in series with one of the supply conductors of the driving motor 22. However, it was found that if such a protector were set to allow the maximum permissible load under conditions when the fan 34 was in operation, that the motor 22 was inadequately protected if the fan 34 failed to operate or if the fan air stream became clogged or diverted. Under such conditions the motor 22 would become overheated and be damaged before its protector would trip.

In order to overcome this difficulty, I have provided a protector 36, which may be used either with or without the usual thermal overload protector, for deenergizing the main driving motor or both motors in case the fan motor 34 fails to operate or in case the air fails to circulate through the duct 32 for some other reason. The protector 36 is connected in series with the supply conductor 38 which includes another switch mechanism 40 connected by the conductor 42 to the protector 36. The protector 36 is connected by the conductor 44 to the auxiliary fan motor 34 and the main driving motor 22 which are connected in parallel circuit relation with each other to the other supply conductor 46.

The thermal protector 36 includes a base 48 of electrical insulating material upon which is mounted the connector post 50 carrying at its lower end a stationary contact. A post 52 carries a thin flexible strip 54 extending to the movable contact 56 which connects the end of the flexible strip 54 with the adjacent end of a rigid toggle lever 58 provided at its opposite end with ears connected by the tension toggle springs 60 to the cross pin 62. This cross pin 62 is provided upon the end of one leg of a bell crank lever 64 which is pivoted upon the pivot pin 66.

This pivot pin 66, as is better shown in Figs. 2 and 3, extends from a post 68 to a metal tube 70 which projects from the container 72 of electric insulating material into the air stream of the auxiliary fan 34. This pin 66 is normally held from rotation by a fusible solder 74 which solders the outer end of the pin 66 to the outside of the tube 70 so as to prevent the pin 66 from rotating. For this particular design, I prefer to use solder which fuses and melts at about 210° F. Fastened to the pin 66 by a pin 76 is a hub 78 which supports one end of a compression type coil spring 80, the other end of which is supported by a collar 82 which presses against bell crank lever 64 and holds it tightly against another collar 84 on the opposite side which is fixed to the pin 66. The bell crank lever 64 is of an electrical insulating material and the arrangement constitutes a friction clutch between the bell crank lever 64 and the pin 66. The tube 70 contains an electric heater 88 which has sufficient capacity to heat the tube 70 above 210° in comparatively still air, but which is insufficient to raise the tube 70 to that temperature when the fan 34 is under operation and the air moves in a normal manner through the duct 32. This heater 88 is connected by asbestos insulated conductors 90 and 92 to the posts 94 and 96. The post 94 is connected to the conductor 42 while the post 96 is connected to the post 50 so that the heater is placed in series with the contacts operated by the toggle mechanism.

In normal operation, the bell crank lever 64 is pushed manually in a clockwise direction as viewed in Fig. 1 until the toggle mechanism trips from the open circuit position, in which the movable contact 56 rests against the stop 98, to the closed circuit position, in which the movable contact 56 rests against the bottom of the post 50. The bell crank lever 64 will be held upon the completion of this operation, in the position shown in Fig. 1 by the friction between the lever 64 and the collar 84, which is fixed to the pin 66.

Should the auxiliary fan motor 34 fail or should the flow of air over the surfaces of the tube 70 cease, the heater 88, which is energized as long as the protector contacts are closed, will heat the tube 70 above the temperature at which the solder 74 melts so that the pin 66 will be free to turn in its bearings provided by the base 68 and the tube 70. Under such circumstances the toggle springs 60 will tend to draw themselves and the lower arm of the bell crank lever into a straight line so that the cross pin 62 is in alignment with the eyelets in the ears provided upon the lever 58 and the pin 66. However, as soon as the center line of the springs 60 cross the line of the flexible strip 54, the toggle mechanism will move to open circuit position, moving the contact 56 away from the bottom of the post 50 against the stop 98 to deenergize the entire system. This will allow the solder 74 to fuse and the protector is ready to be reset manually after an investigation has disclosed and repaired the difficulty which causes the tripping. For example, it may be necessary to replace the fan motor 34.

The end of the bell crank lever 64 which protrudes from the case 72 may be operated manually in a counterclockwise direction as viewed in Fig. 1 to trip open the protector to deenergize the system at will. Thus, the protector may also be used as a shut-off switch.

While the refrigerant condenser unit has been used to illustrate one specific application, it should be understood that this protector may be used wherever the safe operation of the electric motor or the appliance driven by the electric motor depends upon the circulation of a fluid. For example, if the sealed unit 20 were water-cooled the protector might be made responsive to the temperature of the water flowing through the water cooling system. The metal tube 70 encloses the heater 88 in such a way that foreign matter will not readily gain access thereto or to its interior. Likewise the contact mechanism is enclosed in the case 72 so that foreign matter will not accumulate on the switch mechanism. If the parts were not protected in this manner there is a possibility that the accumulation of foreign matter would affect adjustment of the protector.

While the form of embodiment of the invention as herein disclosed, constitutes a preferred form, it is to be understood that other forms might be adopted, all coming within the scope of the claims which follow.

What is claimed is as follows:

1. A condensing unit including a condenser for condensing a fluid, a compressor for compressing the fluid and supplying the fluid to the condenser, an electric motor for driving the compressor, an electrically operated means for circulating a cooling fluid in heat exchange relation with the condenser, and a thermal control connected in series circuit relationship with said electric motor and having a thermal element in heat exchange relation with said cooling fluid and an electric heater in series circuit relationship with said electric motor for heating said thermal element sufficiently to trip said thermal control to deenergize said motor when the cooling fluid fails to circulate during operation of the unit but insufficiently to trip said thermal control when the cooling fluid circulates.

2. A condensing unit including a condenser for condensing a fluid, a compressor for compressing the fluid and supplying the fluid to the condenser, an electric motor for driving the compressor, an electrically operated means for circulating a cooling fluid in heat exchange relation with the condenser, a thermal control having its thermal element in heat exchange relation with said cooling fluid for deenergizing said electric motor upon failure of circulation of said cooling fluid during the operation of the unit, and manually operable means for opening and closing said thermal control to deenergize and reenergize said electric motor at will.

3. A condensing unit including a condenser, a compressor for compressing a fluid and supplying the fluid to the condenser, an electric motor for driving the compressor, an electrically operated means for circulating a cooling fluid in heat exchange relation with the condenser, and a motor current heated thermal control located in heat exchange relation with said cooling fluid for deenergizing said electric motor upon failure of circulation of said cooling fluid during operation of the unit, said control being in series circuit relationship with said electric motor and having its thermal element normally heated by the motor current flowing through said series circuit sufficiently to require cooling by the cooling fluid to prevent its opening.

GEORGE C. PEARCE.